United States Patent [19]
Karlen

[11] 3,983,358
[45] Sept. 28, 1976

[54] SCANNING DEVICE FOR TIG-SPOT WELDING OF COMMUTATOR SEGMENT LUGS TO TAPS ON ROTOR WINDING

[75] Inventor: Urs Karlen, Fislisbach, Switzerland

[73] Assignee: BBC Brown Boveri & Company Limited, Baden, Switzerland

[22] Filed: Nov. 29, 1973

[21] Appl. No.: 419,929

[30] Foreign Application Priority Data
Dec. 12, 1972 Switzerland.................. 18027/72

[52] U.S. Cl............................... 219/124; 219/78; 219/125 PL
[51] Int. Cl.²..................................... B23K 9/12
[58] Field of Search.............. 219/78, 124, 125 R, 219/125 PL

[56] References Cited
UNITED STATES PATENTS

| | | | |
|---|---|---|---|
| 3,045,103 | 7/1962 | Warner | 219/78 |
| 3,553,418 | 1/1971 | Garver et al. | 219/78 X |
| 3,826,894 | 7/1974 | Melvin | 219/124 |
| 3,849,626 | 11/1974 | Linam et al. | 219/124 |

*Primary Examiner*—J. V. Truhe
*Assistant Examiner*—N. D. Herkamp
*Attorney, Agent, or Firm*—Pierce, Scheffler & Parker

[57] ABSTRACT

A scanning device for use in conjunction with TIG spot welding lugs on a commutator to taps on the winding of a rotor includes a scanning arm pivotally mounted on a support which can be actuated between a raised position wherein the lower end of a scanning finger depending from the lower end of the scanning arm is disposed outside a circle circumscribed by the ends of the commutator lugs and a lowered position wherein the scanning finger projects into the gaps existing between adjacent lugs. A welding order is released in response to deflection of the scanning arm brought about by contact between the scanning finger and a lug upon rotation of the rotor as well as an order to actuate the support to its raised position for a predetermined period, the support then being returned to its lowered position for scanning the next adjacent lug.

7 Claims, 8 Drawing Figures

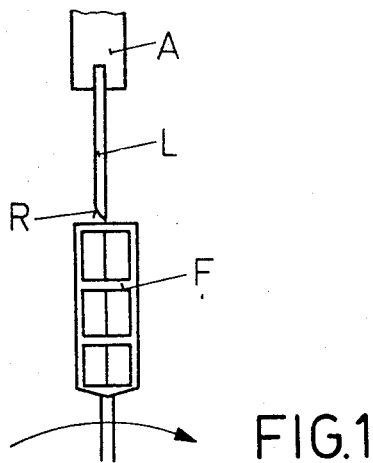
FIG.1
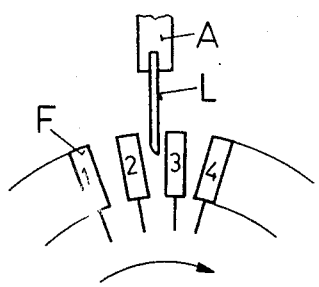
FIG. 3a
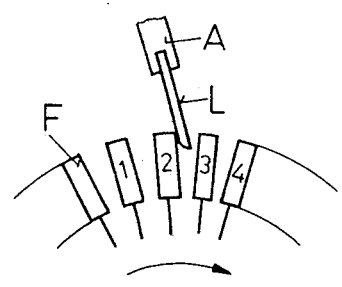
FIG. 3b
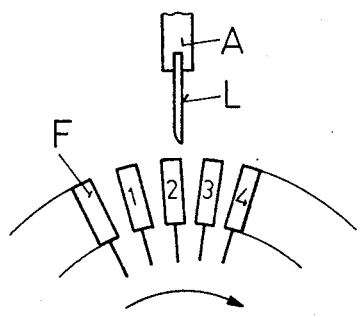
FIG. 3c
FIG. 3

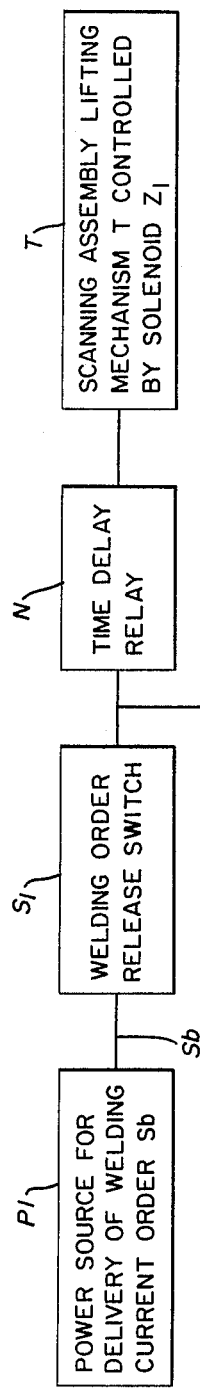
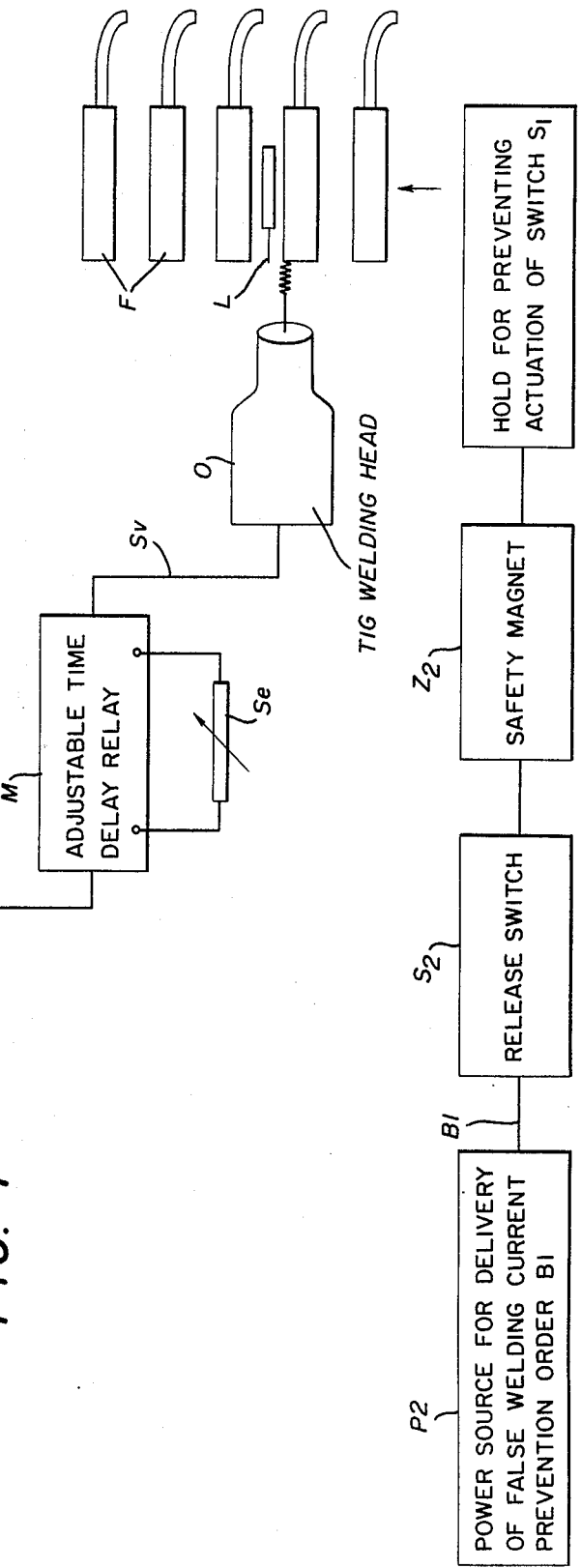
FIG. 4
FIG. 5

SCANNING DEVICE FOR TIG-SPOT WELDING OF COMMUTATOR SEGMENT LUGS TO TAPS ON ROTOR WINDING

The present invention relates to an improved scanning device for use in conjunction with TIG (Tungsten-inert gas) spot welding of the lugs on commutator segments to tap points of a rotor winding.

In a known scanning system for TIG spot welding, which is not intended, however, for lug-type commutators but rather for comb-type commutators, the welding current is controlled by short-circuiting and opening contact points which slide on the commutator. However, this system cannot be used in conjunction with welding of lug-type commutators because of division errors which exist between lamella and lug. It is practically impossible to apply the welding spot at the correct point without re-adjustment.

It has already been suggested to effect the scanning of commutator segment lugs in conjunction with use of the TIG spot welding technique by means of a stroking pin pushed in against a spring tension. Such an arrangement is disclosed in Swiss Patent Application No. 5772/72 filed Apr. 20, 1972, but this arrangement is relatively expensive.

The principal object of the present invention is to provide a reliable solution for the problem of TIG spot welding of lug-type commutators with relatively simple means. This objective is achieved in that a scanning finger adapted to be inserted into the gap between adjacent winding connection lugs on the commutator is pivotally mounted on a support which is adapted to be raised and lowered so that the scanning finger can be lowered into the gap between adjacent lugs for scanning lug position or raised so as to withdraw the scanning finger to a point located outside the circle circumscribed by the ends of the lugs. The scanning finger, which is located in the immediate proximity of the part (lug eye and winding tap) to be spot welded, when in its lowered position will be deflected by contact with the rotating commutator segment lug thereby causing a corresponding deflection of a pivotally mounted arm to which the finger is secured which results in actuation of a switch to release a welding order for the lug-winding tap connection as well as an order for temporarily raising the scanning finger and its supporting structure so as to withdraw the finger from the gap between lugs for a predetermined time sufficient to bring the next adjacent gap between commutator lugs into position with the travel path of the scanning finger as the rotor continues to rotate whereupon the scanning finger is once again lowered into the gap for its next scanning function.

The invention will now be more particularly described with respect to a preferred embodiment thereof which is illustrated in the accompanying drawings wherein:

FIG. 1 is a schematically simplified representation of an eyeleted lug of a commutator segment on a rotor and the finger of the scanning device above it, shown in the half-raised position;

Figure 2:
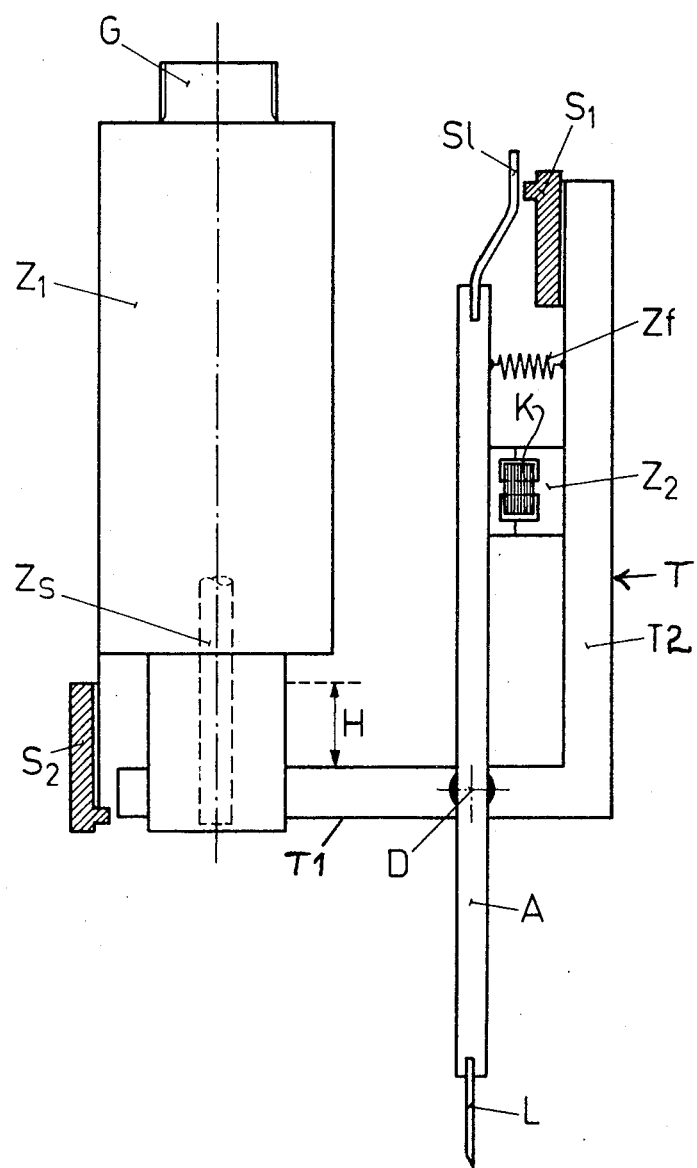
FIG. 2 is a view in elevation of the entire scanning device illustrating the manner in which the scanning finger is pivotally mounted as well as the means by which the finger can be withdrawn from and inserted into the gap between adjacent commutator segment lugs.

FIGS. 3a, 3b and 3c show various positions of the scanning finger and its pivotally mounted support arm relative to the rotor the commutator segment lugs; and FIG. 4 is a block type schematic representation of the electrical circuits controlled by the scanning finger for releasing the successive welding orders as well as for successive temporary withdrawals of the scanning finger from the gaps between adjacent commutator segment lugs as the rotor rotates; and FIG. 5 is also a schematic block diagram of the safety circuit for preventing release of wrongly timed welding current orders.

With reference now to the drawings, FIG. 1 shows one of the eyeleted lugs F provided for one of the segments of a commutator structure installed on the rotor of an electrical machine, the direction of rotation of the rotor, for the purpose of welding each such lug to a tap on the rotor winding, being indicated by the arrow. A scanning finger L which can be made from spring steel is seen in a half-raised position, the finger being secured at its upper end to the lower end of a pivotally mounted support arm A which is further detailed in FIG. 2. In FIG. 1, arm A and scanning finger L are shown in a non-deflected position. The lower end R of scanning finger L is rounded on one side so as to assure that the scanning finger will slide over the end of a lug should the scanning device be lowered prematurely.

FIG. 2 illustrates details of the construction of the overall scanning device. Lever arm A from the lower end of which the scanning finger L depends is pivotally mounted at D on one leg T1 of an L-shaped support member T. At the upper end of the other, vertically extending leg T2 of support T is secured a switch $S_1$ of the inductive type which operates in conjunction with a switch actuating member S1 carried at the upper end of arm A at the opposite side of the pivotal connection from the scanning finger L. In the position depicted in FIG. 2, i.e. arm A in an upright, non-deflected position, parallel to leg T2 of support T, it will be seen that a tension spring Zf connected between A and leg T2 holds an E-shaped armature K of a safety electro-magnet $Z_2$ in registration with the correspondingly configured core of that magnet.

With reference now to FIG. 3a, it is seen that scanning finger L is in a position of rest inserted between adjacent lugs F (2 and 3). As soon as the rotor has turned to the position depicted in FIG. 3b, the scanning finger L and its pivotally mounted support arm A will be deflected in a counter-clockwise direction due to its contact with lug 2. As a result of this deflection, the switching member S1 located at the upper end of arm A is moved away from the inductive responsive switch $S_1$ with the result that a welding current order is released. The length of the lever arm between fulcrum D and scanning finger L is preferably much shorter than the length of the lever arm between this fulcrum and the switch actuating member S1 which results in a highly accurate scanning.

When the inductive responsive switch $S_1$ is actuated, another order is released which functions to effect lifting of the entire scanning assembly to the position depicted in FIG. 3c from which it will be noted that the scanning finger L has been withdrawn from a lower position in the gap between adjacent commutator lugs to a position above a circle circumscribed by the outer ends of these lugs. More particularly, a solenoid $Z_1$ is provided, the coil of which is energized by this order. This solenoid is provided at its upper end with a threaded flange G by which it is secured to a support, not illustrated. Secured to the horizontal leg T1 of the support T is the lower end of an armature $Z_s$ made from a ferromagnetic material which is thereby pulled upwardly into the solenoid $Z_1$ when its winding is energized, thereby causing the scanning assembly, L, A, T to be raised. The height of the pull distance H is limited by a corresponding stop. A crossbeam, not illustrated, on which the support for solenoid $Z_1$ is also mounted, carries the entire scanning device so that adjustment axially of the rotor is also possible; the cross beam is also mounted for adjustment in the vertical direction on a pedestal.

The order for raising the scanning device operates through a time relay whose attraction time determines the excitation time of the solenoid $Z_1$. This time is so selected that when the time relay drops, the next following lug interval, i.e. the gap between adjacent lugs, of the continuously rotating rotor just passes through, i.e. in FIG. 3b the interval between lugs 1 and 2. The scanning device then drops again so that the scanning finger L is inserted into the next gap so as to scan the next lug. 1.

To make certain that no false welding current order $S_b$ is released when the scanning device is either in its raised position or during lowering thereof, the safety electro-magnet $Z_2$ previously referred to, which supplements the function of spring $Z_f$, is arranged to be energized shortly after the scanning device has begun to lift, by a second switching order B1, delivered to its winding, in response to actuation of a second switch $S_2$ also of the inductive type. Energization of the safety electro-magnet $Z_2$ causes its armature K to be attracted to and held by it, thus holding the arm A, which had been initially deflected by contact of the finger L with a commutator lug F, in its initial vertical position and blocking further actuation of switch $S_1$ that initiates the welding orders.

As depicted schematically in FIG. 4 an undelayed welding order Sb released from power source P1 by actuation of switch $S_1$ is conducted over an adjustable time delay relay M in order to obtain a delayed welding current order Sv which actually starts the welding operation by the TIG welding head 0 between the commutator segment lug F and the winding tap. The amount of the delay action is adjustable by a potentiometer $S_e$ on the scanning device. This potentiometer determines the welding start.

The order for excitation of solenoid $Z_1$ for raising the scanning mechanism is also derived from the general welding order $S_b$ and is also conducted over another time delay relay N. The delay of the drop of the time relay N determining the duration of the energization of the pull magnet $Z_1$ is adjustable depending upon the width of the lug and the circumferential speed of the rotor so that lowering of the scanning device will take place at the optimum instant, i.e. when the scanning finger L is located approximately midway of the gap between adjacent lugs. The blocking order B1 for preventing release of false welding current orders is conducted without delay to the winding of the safety magnet $Z_2$ from another power source $P_2$ through switch $S_2$ as shown schematically in FIG. 5.

If desired, the lifting solenoid $Z_1$ for the scanning assembly can be replaced by a functionally equivalent pneumatic cylinder, the piston action of which is controlled by the switch $S_1$ through a two-way valve.

Due to the welding of the eyleted lugs, or stubs, made possible by the invention, the weld joint can be subjected to a greater load, i.e. higher current density, than is the case when a hard or soft soldering technique is used to make the joint. Since the welding spot is only about 1 millimeter deep, the welding material need only undergo a finishing turn by means of a lathe, after which the commutator can be separated from the winding taps. This ensures a good repairability characteristic. The elapsed welding time per rotor is shorter than is the case when the lug connections are made with hard or soft soldering. Moreover, the non-productive or handling time involved in use of a hard or soft soldering technique is reduced by use of the improved welding method according to the invention.

I claim:

1. A scanning device for use in conjunction with spot welding lugs on a commutator to taps on the winding of a rotar comprising a support, a scanning arm pivotally mounted on said support, a scanning finger depending from the lower end of said scanning arm, means for actuating said support between a raised position wherein the lower end of said scanning finger is disposed outside a circle circumscribed by the ends of the commutator lugs and a lowered position wherein said scanning finger projects into the gaps existing between adjacent lugs, means cooperative with said pivotally mounted scanning arm and actuated in response to deflection of said scanning finger with a commutator lug upon rotation of said rotor for releasing a welding order and for activating said actuating means for said support to move the latter from its lowered to its raised position and thereafter return it to its lowered position after a predetermined time delay to scan the next-following commutator lug.

2. A scanning device as defined in claim 1 and which further includes a safety electro-magnet carried by said support and an armature therefor mounted on said scanning arm, and switch means actuated in response to raising of said support for energizing said safety magnet thereby to attract and hold the armature thereof and hence also said scanning arm in its non-deflected position thereby to prevent any false welding orders from being released.

3. A scanning device as defined in claim 1 wherein said support for said scanning arm includes an L-shaped member one part of which extends horizontally and includes pivotal mounting means for said scanning arm, and spring means disposed between said scanning arm and the vertically extending part of said L-shaped support for biasing said scanning arm into a non-deflected vertical position.

4. A scanning device as defined in claim 1 wherein said means which functions to release a welding order and to raise said support upon deflection of said scanning arm is constituted by an electrical switch that includes a stationary part thereof mounted on said support and a movable part carried at the upper end of said scanning arm.

5. A scanning device as defined in claim 1 wherein said means for actuating said support for said scanning arm between its raised and lowered positions is constituted by a solenoid the armature of which is secured to said support.

6. A scanning device as defined in claim 5 and which further includes time delay relay means in association with a circuit for energizing said solenoid for a predetermined time following which said support drops to its lowered position.

7. A scanning device for use in conjunction with spot welding lugs on a commutator to taps on the winding of a rotor comprising an upright L-shaped support, a scanning arm pivotally mounted on the horizontally extending part of said support, a scanning finger depending from the lower end of said scanning arm, a solenoid having an armature secured to said horizontally extending part of said support for actuating said support between a raised position wherein the lower end of said scanning finger is disposed outside a circle circumscribed by the ends of the commutator lugs and a lowered position wherein said scanning finger projects into the gaps existing between adjacent lugs, first switch means including a stationary part mounted on the vertically extending part of said support and a movable part carried at the upper end of said scanning arm, said switch means being actuated in response to deflection of said scanning arm brought about by contact of said scanning finger with a commutator lug upon rotation of said rotor for releasing a welding order and for energizing said solenoid thereby to move said support from its lowered to its raised position, time delay means delaying de-energization of said solenoid to effect a delayed return of said support to its lowered position for scanning of the next-following lug, spring means disposed between said scanning arm and said vertically extending part of said support for biasing said scanning arm into a non-deflected vertical position, a safety electromagnet mounted on the vertically extending part of said support and an armature therefor carried by said scanning arm, and second switch means actuated in response to raising of said support for energizing said safety magnet thereby to attract and hold the armature thereof and hence also said scanning arm in its non-deflected position thereby to prevent any false welding orders from being released.

\* \* \* \* \*